(No Model.)

C. FISHBAUGH.
HEATER FOR STOCK WATERING TANKS.

No. 410,357. Patented Sept. 3, 1889.

Witnesses.
Geo. E. Frech.
R. W. Bishop.

Inventor
Charles Fishbaugh
By his Attorneys

UNITED STATES PATENT OFFICE.

CHARLES FISHBAUGH, OF YORK, NEBRASKA.

HEATER FOR STOCK-WATERING TANKS.

SPECIFICATION forming part of Letters Patent No. 410,357, dated September 3, 1889.

Application filed March 21, 1889. Serial No. 304,212. (No model.)

*To all whom it may concern:*

Be it known that I, CHARLES FISHBAUGH, a citizen of the United States, residing at York, in the county of York and State of Nebraska, have invented a new and useful Improvement in Heaters for Stock-Watering Tanks, of which the following is a specification.

My invention relates to improvements in heaters for stock-watering tanks; and it consists in certain novel features hereinafter described and claimed.

Figure 1:
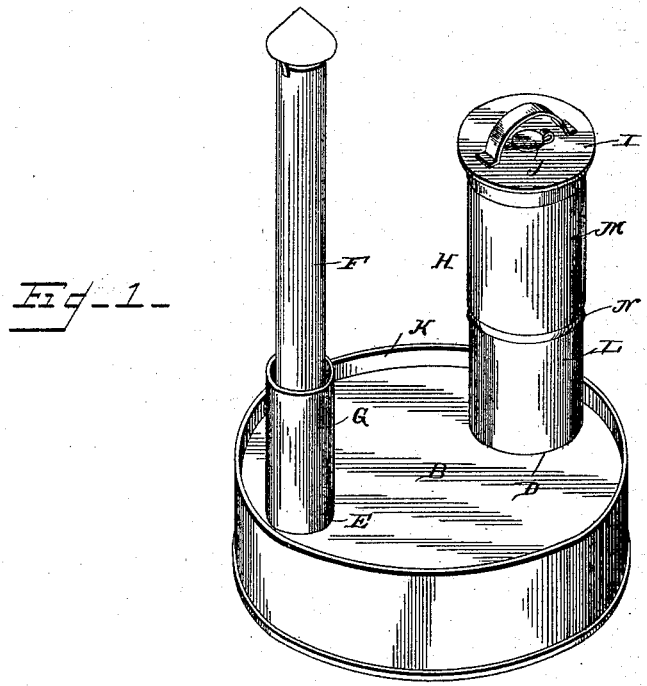
Figure 2:
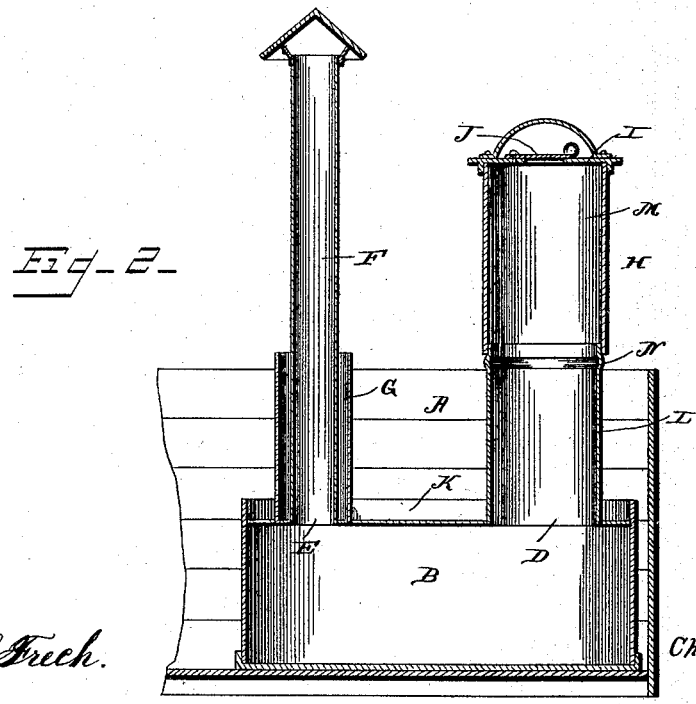

In the accompanying drawings, Figure 1 is a perspective view of my improved heater, and Fig. 2 is a vertical sectional view of the same, showing it in position in a tank.

The tank A may be of any desired capacity and of any suitable construction, and forms no part of my invention.

My improved heater comprises a cylindrical casing B, which may be of any size desired and of any suitable material, and is provided in its top with the openings D E. The smoke-stack F rises from the opening E, and communicates with the interior of the casing through said opening.

Around the lower portion of the smoke-stack I arrange a cylindrical casing or reservoir G, which is adapted to hold the unclean water which runs down the smoke-stack, and prevent the same from mingling with the clean water which it is desired to have the stock drink. A magazine or fuel-feeding cylinder H is arranged on the upper side of the cylindrical casing over the opening D therein, and is provided with a removable cover I having a damper J. This magazine is arranged directly over the grate and is adapted to contain the fuel to feed the fire. The lid I is removed when placing fuel in the magazine and then replaced, the damper J being opened so as to provide the draft necessary to support combustion. The magazine is made in two sections L M, as shown, the lower section L rising from the casing over the opening D, and the upper section M resting on an annular flange or bead N of the lower section. The lid I is arranged on the upper end of the upper section, as shown.

The casing is provided on its upper side around its edge with a vertical flange K, which prevents the escape of the water which may collect on the upper side of the casing. The top of the casing is thus prevented from melting when the water in the tank is low.

From the foregoing description it is thought that the manner of using my device and the advantages to be derived therefrom will be readily understood. The heater is placed in the tank and the fire kindled therein, and the entire casing will soon become heated so as to radiate heat into and through the body of water in the tank, and thereby raise the same to the desired temperature. It will be observed that I provide a large surface which will be in contact with the water, and consequently raise the temperature of the water very quickly. After the fire has been once started the device requires no attention on the part of the operator, and will be automatically suppplied with fuel from the magazine. When the casing has become nearly filled with ashes, the magazine is removed and the ashes taken out through the opening D.

My device is very simple, and consequently is not liable to get out of order, and can be manufactured at a small cost, and its advantages are thought to be obvious.

When the fire is first started, the upper section of the magazine is removed and the casing entirely filled with fuel. The fire is then kindled, and after it has obtained a good headway the magazine is filled, the upper section being replaced and the damper opened more or less to permit the necessary draft. As the fuel is consumed, the ashes accumulate in the casing, and when they entirely fill the casing will cause the fire to die. The magazine is then removed and the ashes taken from the casing.

Having thus described my invention, what I claim, and desire to secure by Letters Patent, is—

A heater for stock-watering tanks, consisting of the casing provided with a vertical flange on its upper face around the edge, and having openings D E in its upper face, the smoke-stack rising from the opening E, the cylindrical casing or reservoir arranged around the lower portion of the smoke-stack and extending above the sides of a tank, the magazine composed of the section N, rising from the opening D, and provided with a flange or bend, and the section M, resting upon the flange or bend and the damper, substantially as described.

In testimony that I claim the foregoing as my own I have hereto affixed my signature in presence of two witnesses.

CHARLES FISHBAUGH.

Witnesses:
MERTON MEEKER,
GEO. S. COOK.